June 20, 1944.  S. K. TALLEY ET AL  2,351,644
CORROSION TESTING ELEMENT
Filed Aug. 22, 1942
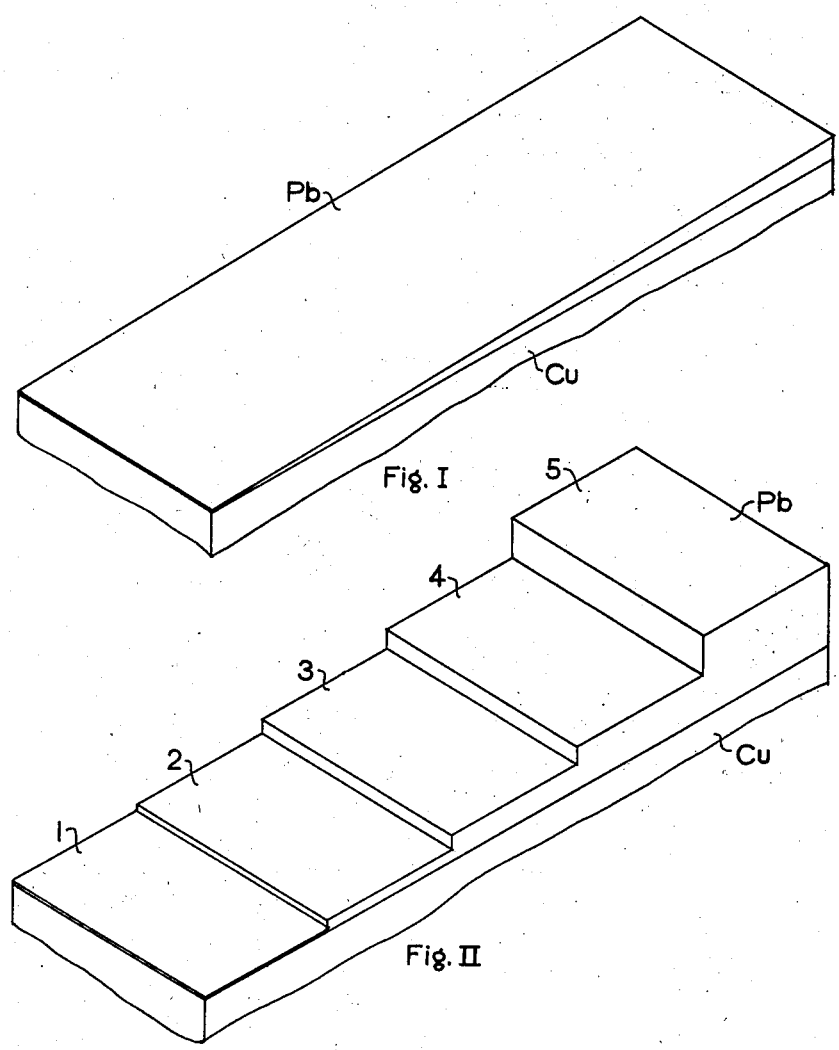
Fig. I
Fig. II
Inventors: Samuel K. Talley
Leo D. Grenot
By their Attorney:

Patented June 20, 1944

2,351,644

UNITED STATES PATENT OFFICE 2,351,644

CORROSION TESTING ELEMENT

Samuel K. Talley, Berkeley, and Leo D. Grenot, Oakland, Calif., assignors to Shell Development Company, San Francisco, Calif., a corporation of Delaware Application August 22, 1942, Serial No. 455,976

12 Claims. (Cl. 73—51)

This invention relates to apparatus suitable for testing the corrosion rate of metals in the presence of corrosive substances and more particularly to apparatus suitable for testing the corrosivity of lubricating oils with respect to bearing metals.

In many industrial processes, in the operation of internal combustion engines and in numerous other instances, metal parts of equipment are in contact, either constantly or intermittently, with substances which are either corrosive or become so after a period of use. Accordingly, it has been common practice in the past to attempt to determine the rate of corrosion of the metal parts by various means in order to take steps to modify the corrosive conditions, in the event that the rate of corrosion increases to a point where substantial damage to the metal parts will take place over a short time interval. For example, U. S. Patent 1,972,728 describes a method of determining corrosion rate wherein non-corrodable buttons are inserted within a vessel which is to be subjected to the action of a corrosive material, the interior of the vessel being periodically examined thereafter and the buttons used as bench marks to determine the rate at which the interior of the vessel is being attacked by the corrosive material. In operating internal combustion engines the lubricating oil in the crankcase gradually deteriorates until it begins to have a definite corrosive action upon the bearing metals within the engines. It has been a practice, therefore, in order to determine the corrosivity of the oil, to insert specimens of the bearing metals in the oil and maintain them under controlled temperature conditions for a period of time, usually a matter of days or weeks, periodic visual examinations being made to determine the condition of the bearing metal. This method is considered unsatisfactory both from the viewpoint of the time consumed and the fact that it does not yield quantitative results for comparative purposes.

Chemical tests are also used to determine the rate of corrosion of petroleum products and lubricants, as for example the commonly used neutralization number (A. S. T. M. designation: D188–41T) which is indicative of the quantity of acid or alkali required to neutralize a given quantity of oil. This test is considered unreliable for purposes of indicating the likelihood of corrosion in view of the fact that it has been found that in many instances, in comparing two oils, the one having the lower neutralization number is actually more corrosive in its action on bearing metals than the oil having the higher indication of acidity or alkalinity. The above systems and others that have been proposed all have certain disadvantages and drawbacks such as, for example, excessive time consumed in making the test, unreliability as indication of the actual degree of corrosivity, lack of quantitative results for comparative purposes, complicated and expensive installations, etc.

It is an object of the present invention to provide a test element which provides a positive indication of corrosive conditions under operating conditions of the system which is to be tested. Another object is to provide a test element which yields a quantitative value in a short period of time. A further object is to provide such an element which is easily and inexpensively prepared.

Other objects, together with some of the advantages to be derived from utilizing the present invention, will become apparent in the following detailed description thereof and drawing, wherein Figure I is an exaggerated perspective view of one embodiment of the invention showing a corrosion testing element including a wedge test strip and Figure II illustrates a second embodiment of the invention including a step wedge test strip.

For purposes of illustration the invention will be described primarily with reference to the preparation of a test element for use in determining the corrosivity of lubricating oils with reference to the bearing metals in common use at present. It is to be understood, however, that the principle involved may be applied to the preparation and use of suitable test elements for determining the corrosivity of any corrosive substance with reference to any given metal or combination of metals.

Briefly the present invention comprises the deposition by electrical, chemical or vapor condensation means, of a quantity of the metal which is to be tested upon a suitable carrier, the deposition being carried out in such a manner as to provide a thin wedge of the metal which ranges in thickness from the order of millionths of an inch at its thinnest end to thousandths at the thickest end. The test element thus formed may either be inserted directly in equipment being tested at a point where the metal of the equipment is in contact with a corrosive substance, or, if this is impracticable, the test element may be utilized in a small scale duplicate system in which similar operating conditions are maintained. The metal to be tested may be deposited upon the carrier in any suitable manner, as for example by electroplating, chemical deposition or evaporation of the metal, as will be described in detail below. The metal may also be deposited by spraying at liquid temperatures according to the method commonly known as "metallizing."

Referring to the drawing, Figure I illustrates a corrosion testing element according to the present invention wherein a lead test wedge has been deposited on a copper carrier strip. The deposition may be carried out by any of the methods described below, the method of Example II being preferable. Figure II illustrates a corrosion testing element wherein a lead step wedge has been deposited on a copper carrier strip according to Example II below. In this instance, particularly suitable dimensions for the corrosion testing elements for general purpose use are approximately as follows: step 1 of the lead step wedge, 0.000002 inch thick; step 2, 0.000006 inch; step 3, 0.000020 inch; step 4, 0.000063 inch; step 5, 0.0002 inch.

In those instances where a galvanic couple between two metals is formed and galvanic phenomena must, as a result, be considered as factors in determining corrosion rates, as is sometimes true in the case of engine bearings, one of the metals is preferably utilized as the carrier and the other (usually the one most susceptible to corrosion) deposited thereon. For example, if lead-copper bearings are used in an engine, a test element for determining the corrosivity of the lubricating oil may be prepared by depositing a lead wedge upon a strip of copper. Similarly, if cadmium-nickel or cadmium-silver bearings are used, cadmium wedges may be deposited upon either nickel or silver as the case may be. In this manner a test element may be prepared which will provide a corrosion rate indication which may be directly applied to the corrosion rate of the bearings themselves, galvanic factors being thus included in the test element. A suitable porosity in the layer of deposited metal is required in order to provide reasonably short electrolytic paths in media of low electrolytic conductivity.

In the following examples the procedure is given for preparing test elements comprising either copper or lead or both on a glass carrier, the metals being deposited by evaporation, and lead deposited on copper by means of electroplating.

*Example I*

A suitable carrier, as for example a 1-inch by 3-inch glass microscope slide, is positioned within a deposition chamber above a tungsten ribbon provided with a depression in which a pellet of the metal to be deposited is placed. One end of the carrier is placed directly over the metal pellet and the carrier supported in a plane at a 90° angle to a line passing through the metal pellet and the near end of the carrier. The deposition chamber is then evacuated to a pressure not exceeding about $10^{-4}$ mm. Hg and the tungsten ribbon electrically heated to dull red temperature, this condition being maintained until the metal pellet has evaporated. The thickness of metal deposited on the carrier at a given distance from the end of the carrier positioned over the metal pellet, i. e. at a given distance from the thickest end of the metal wedge deposited, is approximated by the following formula:

$$t_1 = t_2 \frac{r^3}{(x^3+r^3)^{\frac{1}{2}}}$$

wherein $t_1$=thickness of the metal wedge at the point to be determined.
$t_2$=thickness of the metal at the thickest end of the wedge. (Determined by means of a micrometer.)
$x$=distance from the thickest end of the wedge to the point to be determined.
$r$=distance between the metal pellet and the nearest end of the carrier.

As a specific example, a lead pellet weighing 0.15 gm. was placed in the depression in the tungsten ribbon and a microscope slide positioned as described above, the distance between the lead pellet and the near end of the microscope slide being 3 cm. After evaporation of the lead pellet, a lead wedge varying in thickness from approximately 0.0005 inch to 0.00005 inch was found to have been deposited on the microscope slide. Any desired metal may be deposited according to the procedure described above. Those metals which tend to alloy with tungsten at high temperatures should, however, be placed in a small crucible formed of an inert material and the tungsten heating element placed around the outside of the crucible in order to provide indirect heating of such metals.

If it is desired to prepare a test element according to the above procedure which includes two metals, a suitable grid having longitudinal bars is interposed between the metal pellet and the carrier. Evaporation of a metal pellet then produces a series of spaced, wedge-shaped bars on the carrier. The grid is then shifted to one side a suitable distance and the evaporation process repeated with a different metal. As a result, alternate contacting wedge-shaped bars of the two metals are deposited on the carrier. Other transparent carriers, such as polystyrene or methyl methacrylate resins, may be utilized in preparing a test element in the manner described above.

*Example II*

A lead plating bath was prepared having the following composition:

| | | |
|---|---|---|
| Basic lead carbonate | grams | 120 |
| Hydrofluoric acid (50% conc.) | do | 192 |
| Boric acid | do | 84 |
| Glue | do | 0.15 |
| Water to make | cc | 800 |

Two lead anodes, each having dimensions 3 inches by 3 inches, were supported in the above bath, separated by a distance of 2 inches. A copper strip ¼ inch wide and 3 inches long served as the cathode and was supported midway between the anodes. The copper carrier was plated with a coating of lead having a thickness of 0.000002 inch, 160 millivolts and a time of 4.5 seconds being utilized. The plated carrier was then removed from the plating bath, washed in water and alcohol and dried, these operations being carried out as rapidly as possible. The lower ½ inch of the dried, plated carrier was immediately thereafter dipped in melted paraffin and then reinserted in the plating bath, the paraffin coating preventing further lead deposition on the lower end thus treated. The strip was then further alternately plated and dipped into melted paraffin, each time to a greater depth, until the desired number of steps of lead plating had been deposited, the washing and drying step outlined above being carried out after each plating step.

A typical test element is provided with five steps, the lead thickness of the various steps ranging in geometrical sequence from .0002 inch to .000002 inch. In this instance, the thickest step of the lead wedge should be removed in about 1 hour when immersed in a corrosive oil maintained at a temperature of approximately 140° C. The thinnest step should be but slightly attacked by a non-corrosive oil during the same time interval and at the same temperature. The thickness of the steps of the lead wedge must, of course, be adjusted accordingly and calibrated for use at other temperatures.

In the the plating procedure described above, it has been found that optimum results are obtained if a current density between 10 and 20 amperes per square foot is maintained with the given electrode separation and configuration.

Test elements may also be prepared by chemically depositing the test metal on a carrier, as for example by immersing an iron carrier in a copper sulphate or copper cyanide solution. Similarly, silver may be deposited on nickel by immersing a nickel carrier in a silver cyanide solution and in general most metals may be satisfactorily deposited on other metals higher in the electromotive series of the metals. Further, many metals, particularly silver, may be deposited on glass and similar carriers by chemical precipitation such as is commonly used in preparing mirrored surfaces.

The test element prepared according to Example I provides an evenly graduated wedge of the test metal or metals on the glass slide. In Example II the lead is deposited on the copper strip as a step wedge, the thinnest step of the wedge having a thickness of approximately .000002 inch and the thickest step .0002 inch. This type of test element, i. e. having a step wedge metal coating, has been found particularly suitable for practical use in testing the corrosivity of lubricating oils in engines. For more critical testing purposes, as for example in laboratory tests for comparison of several similar oils, an evenly graduated wedge of lead on copper may be prepared according to the method of Example II by withdrawing or inserting the copper strip at an even rate rather than in the stepwise manner described. In such instances, if a protective coating is desired, the copper strip may be first inserted in the plating bath and a layer of oil thereafter poured on the surface of the bath. As the copper strip is slowly withdrawn from the plating bath it will pass through the oil layer and thus be coated with a protective layer of oil. The test element prepared according to Example I may also be provided with a protective layer of paraffin or oil by flooding the deposition vessel with melted paraffin or oil before releasing the vacuum or by dipping the test element after its removal from the vessel. Test elements prepared according to Example II may be stored for an indefinite period of time before use without deterioration.

By way of example, when it is desired to test the corrosivity of an oil in an engine which includes copper-lead bearings, a previously prepared test element is simply inserted in the crankcase of the engine either attached to the oil dipstick or in any other suitable manner and allowed to remain there for a period of one hour. The paraffin coating on the test element is immediately removed by the circulating hot oil. After removal from the crankcase at the end of the hour interval, the test element is examined visually and the amount of lead which has been removed by the oil noted. This may be easily determined since the copper surface will be visible where the lead has been removed. Thus, if a test element prepared according to Example II is examined after exposure to the crankcase oil in an engine and it is found that the lead has been removed only from the thinnest step of the step-wedge, it is then known that the oil will corrode lead in the presence of copper at the rate of .000002 inch per hour. Since it has been established that a corrosion rate of .0002 inch per hour of lead at engine operating temperatures (about 140° C.) takes place in the presence of a severely corrosive oil and a corrosion rate of .00002 inch per hour of lead is considered to indicate a mildly corrosive oil, an oil which the test element indicates causes a corrosion rate of only .000002 inch per hour may be classified as non-corrosive and suitable for further use in engines with crank case temperatures in the range of from 120 to 140° C. Times of testing and interpretation of results with engines operating at other crank case temperatures must be established according to the particular requirements of the engine.

For more critical determinations where a test element having an evenly graduated wedge deposited thereon is used, comparative tests may be made by simply measuring the distance over which the metal has been removed by the corrosive material, care being exercised in using test elements which all have identical wedges deposited on them. For quantitative determinations, the actual rate of corrosion may be easily calculated. For example, if one-half of the metal is removed from a wedge of known length which has a thickness range from .0002 inch to .000002 inch, it is apparent that metal up to a thickness of .000101 inch has been removed from the wedge, or in other words if the test element has been in contact with the corrosive material for a period of an hour, the corrosive rate is .000101 inch per hour.

If severe localized corrosion, commonly known as "pitting," occurs, the approximate depth of the pits may be determined in the same manner, i. e. by measuring the distance of the deepest pit from one end of the wedge and calculating the metal thickness of the wedge at this point.

The thickness range of the wedge which is to be deposited in preparing a given test element will vary, for optimum results, with different test metals and carriers. In general, best results are attained if the wedge is adjusted so that at its thinnest end it satisfactorily covers the carrier and is clearly visible, the other end being somewhat thicker in inches than the greatest corrosion rate under severely corrosive conditions which will occur during a given suitable time interval. As has been pointed out above, the carrier is preferably formed of a relatively inert material such as glass or the like, although this term is intended to include other materials, such as suitable metals, which are relatively inert to the corrosive conditions which are being tested for the time interval necessary for proper utilization of the test element. For example, in the instances described above where copper is used as a carrier material for lead test wedges, the copper may also be attacked eventually by a corrosive oil. However, for the period of the test, i. e. one hour, the copper may be considered relatively inert as compared to the lead. In many instances, particularly if the carrier has a thickness of at least of the order of hundredths of an inch and preferably of the order of tenths of an inch, the rate of corrosion of the carrier will have little, if any, effect upon the corrosion rate reading obtained on the metal wedge of the test element, in which cases it is not necessary to utilize a carrier formed of a relatively inert material.

In the step wedge type of test element (described in Example II), which is the most satisfactory for general use where extreme accuracy is not necessary, it has been found advantageous to utilize a carrier in the form of a flat strip. Indicia may then be etched, stamped or otherwise marked on the carrier at given intervals, each interval corresponding to a step on the step wedge which is thereafter deposited and each indicum corresponding to the actual thickness of the metal in each step of the step wedge. In this manner a close approximation of the corrosion rate of a corrosive material with relation to a given metal may easily be determined by an inexperienced person by simply inserting the test element in the suspectedly corrosive material for a suitable period of time and then visually inspecting it, the indicum on the last corroded step of the step wedge giving the corrosion rate for the time interval elapsed.

We claim as our invention:

1. In a corrosion testing element of the class described, the combination comprising a carrier and a test metal wedge deposited thereon.

2. In a corrosion testing element of the class described, the combination comprising a carrier formed of a relatively inert material and a test metal wedge deposited thereon.

3. In a corrosion testing element of the class described, the combination comprising a carrier and a test metal wedge deposited thereon, said metal wedge approaching the limit of visibility at its thinnest end.

4. In a corrosion testing element of the class described, the combination comprising a carrier and a test metal deposited thereon, said test metal being deposited on said carrier in the form of a step wedge.

5. In a corrosion testing element of the class described, the combination comprising a metal carrier and a test metal wedge deposited thereon, said metals forming said carrier and said wedge forming a galvanic couple.

6. In a corrosion testing element of the class described, the combination comprising a copper carried and a lead test wedge deposited thereon.

7. The test element according to claim 6 wherein the thickness of the lead test wedge falls within the approximate range of .000002 inch to .0002 inch.

8. The test element according to claim 6 wherein the lead test wedge is deposited on the carrier in the form of a step wedge, the thinnest step of said wedge having a thickness of the order of .000002 inch.

9. In a corrosion testing element of the class described, the combination comprising a nickel carrier and a cadmium test wedge deposited thereon.

10. In a corrosion testing element of the class described, the combination comprising a silver carrier and a cadmium test wedge deposited thereon.

11. In a corrosion testing element of the class described, the combination comprising a transparent carrier and a test metal wedge deposited thereon.

12. In a corrosion testing element of the class described, the combination comprising a glass carrier and a test metal wedge deposited thereon.

SAMUEL K. TALLEY.
LEO D. GRENOT.